United States Patent [19]
Ewing

[11] Patent Number: 5,361,800
[45] Date of Patent: Nov. 8, 1994

[54] LIQUID PUMP AND VAPORIZER

[75] Inventor: James H. Ewing, Lexington, Mass.

[73] Assignee: MKS Instruments, Inc., Andover, Mass.

[21] Appl. No.: 97,271

[22] Filed: Jul. 23, 1993

Related U.S. Application Data

[62] Division of Ser. No. 751,173, Aug. 28, 1991.

[51] Int. Cl.⁵ ............................................ F16K 31/365
[52] U.S. Cl. .................................... 137/495; 137/510
[58] Field of Search .................. 137/510, 509, 495; 251/335.3

[56]         References Cited
         U.S. PATENT DOCUMENTS

| | | | |
|---|---|---|---|
| 2,528,440 | 10/1950 | Kmiecik | 137/510 |
| 2,949,768 | 8/1960 | Ryant . | |
| 3,151,562 | 10/1964 | Swartz . | |
| 3,529,622 | 9/1970 | Weise et al. | 137/510 X |
| 3,583,440 | 6/1971 | Andersson | 137/509 X |
| 4,352,252 | 10/1982 | Brenot . | |
| 4,352,636 | 10/1982 | Patterson et al. . | |
| 4,493,614 | 1/1985 | Chu et al. . | |
| 4,620,562 | 11/1986 | Pacht | 137/509 X |
| 4,936,342 | 6/1990 | Kojima et al. | 137/510 |
| 5,098,741 | 3/1992 | Nolet et al. . | |
| 5,193,575 | 3/1993 | Do | 137/509 |
| 5,204,314 | 4/1993 | Kirlin et al. . | |

FOREIGN PATENT DOCUMENTS

| | | |
|---|---|---|
| 0023855 | 2/1981 | European Pat. Off. . |
| 0341031 | 5/1988 | European Pat. Off. . |
| 0309596 | 4/1989 | European Pat. Off. . |
| 0323448 | 7/1989 | European Pat. Off. . |
| 0352727 | 1/1990 | European Pat. Off. . |
| 0376497 | 7/1990 | European Pat. Off. . |
| 2188696 | 1/1974 | France . |
| 2581442 | 11/1986 | France . |
| 98324 | 9/1896 | Germany . |
| 944669 | 10/1951 | Germany . |
| 4029071 | 3/1992 | Germany . |

Primary Examiner—Stephen Hepperle
Attorney, Agent, or Firm—Lappin & Kusmer

[57]            ABSTRACT

An improved vaporization system includes an automated valve and positive displacement pumping system using a pair of pumps operating in opposition to one another to provide continuous and constant volumetric flow at a constant predetermined pressure to an improved vaporizer using a stack of heated disks to flash vaporize the liquid. The valves are improved by providing one way flow.

2 Claims, 6 Drawing Sheets

LIQUID PUMP AND VAPORIZER

This application is a divisional application of U.S. Ser. No. 07/751,173 filed Aug. 28 1991 pending.

The present invention relates to liquid pumps and vaporizers, and more particularly to an improved liquid delivery and vaporization system including a novel positive displacement pump assembly for delivering a continuous volume flow at a constant rate to an improved vaporizer assembly for flash vaporizing the liquid.

Many processes are known where corrosive, sometimes pyrophoric, liquid materials must be vaporized so that the gas vapors can be subsequently used in carefully controlled amounts in a process chamber as a part of a carefully environmentally controlled process. Because of the toxic and dangerous nature of these materials, systems for delivering the liquids to the vaporizer, as well as the vaporizer itself, must be carefully sealed to prevent the escape of the materials. Various such systems are known. One type of system automatically fills the liquid into a bottle. The bottle is heated in order to increase the vapor pressure in the bottle up to a sufficient pressure so that a thermal mass or pressure based flow meter can be used to measure and control the flow of the gas. In some of these systems inert gas is also bubbled through the liquid in order to help carry off more vapor. Such systems tend to be relatively expensive and cumbersome, with vapor flow lines requiring extensive heating to prevent condensation.

It is a principal object of the present invention to provide an improved liquid delivery vaporization system which overcomes, or substantially reduces the problems of the above-noted prior art.

A more specific object of the present invention is to provide an improved relatively simple and inexpensive liquid delivery and vaporization system adapted to be mounted directly on the processing chamber requiring few, if any, vapor flow lines.

Another object of the present invention is to provide an improved vaporizer for vaporizing a liquid in an energy efficient manner, with minimal atomization, and without the need for additional inert gases.

And another object of the present invention is to provide an improved positive displacement pumping system for delivering liquid to a vaporizer at a continuous constant volumetric flow rate and subtantially independent of downstream pressure.

And yet another object of the present invention is to provide an improved pump assembly for pumping liquid at a continuous, constant volumetic rate with minimal parts exposed to the liquid passing through the pump.

And still another object of the present invention is to provide an improved valve for allowing flow to occur only in one direction when a threshold pressure at the inlet of the valve has been achieved.

In accordance with one aspect of the present invention these and other objects of the present invention are achieved by an improved vaporizer comprising a plurality of relatively thin disks supported in a stack and heated above the vaporization temperature of the liquid so that when liquid is forced between adjacent surfaces of the disks the liquid flash vaporizes with little atomization In accordance with another aspect of the present invention an improved valve system is provided. The valve system comprises means for biasing a valve body closed on a valve seat with sufficient force so that the valve will open in response to a predetermined pressure at its inlet, but will not open in response to the predetermined pressure when exerted as back pressure on the valve body while the valve system is closed. Means are also provided for independently exerting a force opposite the biasing force so that the valve can be opened.

In accordance with another aspect of the present invention an improved pump is provided. The pump pumps fluid at a continuous and constant volumetric rate. The pump comprises means for varying the volume of the pump chamber so that the pump can be filled and liquid subsequently delivered. The means for varying the volume of the pump chamber includes a compartment filled with a substantially incompressible fluid, such as oil. The compartment and chamber are separated by means for decreasing the volume of the chamber when the actuating means applies pressure to the incompressible liquid so as to provide positive pressure toward the outlet, and increasing the volume of the chamber when the actuating means withdraws pressure from the incompressible liquid so as to provide negative pressure relative to the inlet so as to fill the chamber.

Figure 1:
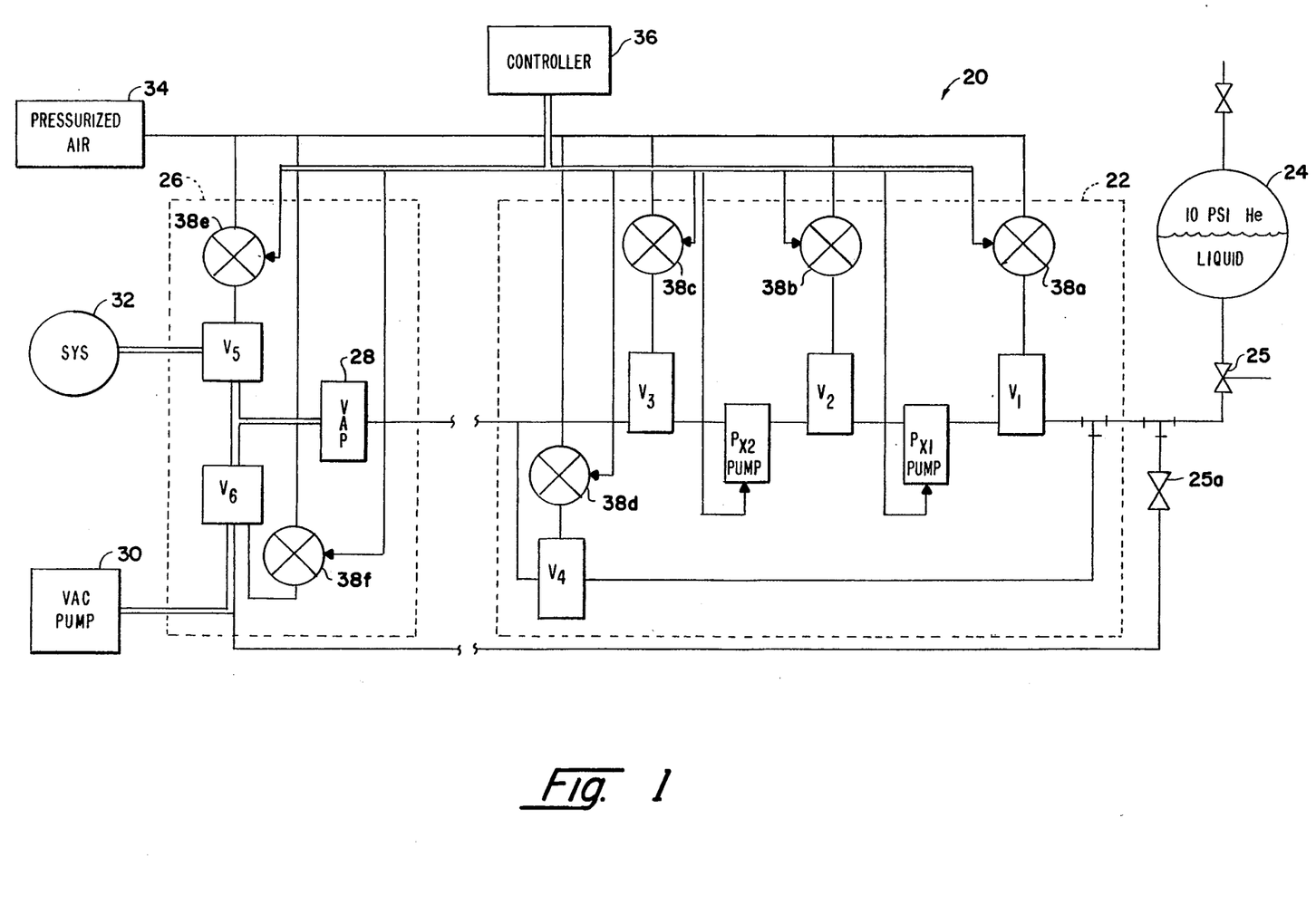
FIG. 1 is a schematic diagram generally illustating the preferred delivery and vaporization system of the present invention.

Finally, in accordance with yet another aspect of the present invention an improved positive displacement pump assembly is provided for pumping fluid at a continuous, predetermined volumetric rate- The assembly includes control means for cyclically operating a first pumping means (shown and described in FIG. 1 as $P_{x1}$) connected between a first and second valve means (shown and described in FIG. 1 as $V_1$ and $V_2$, respectively) and second pumping means (shown and described in FIG. 1 as $P_{x2}$) connected between the second and a third valve means (shown and described in Fig. 1 as $V_2$ and $V_3$ respectively) as follows:

(a) with the first valve means ($V_1$) open and the second valve means ($V_2$) closed, operating the second pump means ($P_{x2}$) in its delivery phase so as to pump fluid in the chamber of the second pumping means ($P_{x2}$) through the third valve means ($V_3$), and operating the first pump means ($P_{x1}$) in its filling phase so as to fill the chamber of the first pumping means with fluid passing through the first valve means ($V_1$) at a volumetric rate greater than the predetermined rate so that the chamber of the first pump means ($P_{x1}$) is filled prior to the completion of the delivery phase of the second pump means ($P_{x2}$);

(b) closing the first valve means ($V_1$) while maintaining the second valve means ($V_2$) closed when the chamber of the first pump means ($P_{x1}$) is filled;

(c) commencing the first pump means ($P_{x1}$) in the delivery phase while maintaining the first and second valve means closed ($V_1$, $V_2$) so that when the fluid in the first pump means ($P_{x1}$) reaches a predetermined pressure (i) the second valve means ($V_2$) opens and the third valve means ($V_3$) remains open, (ii) the second pump means ($P_{x2}$) commences its filling phase, and (iii) the first pump means ($P_{x1}$) continues operating in its delivery phase so that the volume of fluid delivered from the chamber of the first pump means ($P_{x1}$) to the chamber of the second pump means ($P_{x2}$) while the latter is filling results in fluid passing though the third valve means ($V_3$) at the predetermined volumetric rate.

Other objects of the invention will in part be obvious and will in part appear hereinafter. The invention accordingly comprises the apparatus possessing the construction, combination of elements and arrangement of parts which are exemplified in the following detailed disclosure, and the scope of the application of which will be indicated in the claims.

For a fuller understanding of the nature and objects of the present invention, reference should be had to the following detailed description taken in connection with the accompanying drawings, wherein.

In the drawings the same numbers are used to referred to the same or similar parts, and the same number with letters designating identical parts.

Referring to FIG. 1, the vaporization system of the present invention, generally shown at 20, comprises a pump assembly 22 having its inlet connected to a reservoir 24, the latter preferably being pressurized. The liquid provided by reservoir 24 to the assembly 22 can be controlled with the valve 25 separately operated by the operator. Pump assembly 22 is a positive displacement pump adapted to continuously pump liquid at a constant volumetric rate. The pump assembly has a first valve $V_1$ having an inlet connected to receive liquid from the reservoir 24 and an outlet connected to the inlet of a first pump $P_{x1}$. The outlet of the pump $P_{x1}$ is connected to the inlet of valve $V_2$, which in turn has its outlet connected to the inlet of pump $P_{x2}$. The latter has its outlet connected to the inlet of valve $V_3$. The outlet of valve $V_3$ forms the outlet of the pump assembly 22. A fourth valve $V_4$ has its inlet connected to the outlet of valve $V_3$ and its outlet connected to the inlet of valve $V_1$ and is used when the pump assembly operates in a recirculating mode. As will be described in greater detail hereinafter, the valves $V_1$, $V_2$, $V_3$ and $V_4$ are each designed as "one way" valves so that, if closed, they will not open in response to back pressure.

The system 20 also includes a vaporizer assembly 26 having a vaporizer 28, the latter having its inlet connected to the outlet of the pump assembly 22 (i.e., the outlet of the valve $V_3$) so as to receive the liquid output of the pump assembly. Valve 25a and its downstream piping are used for pump and vaporizer evacuation such that the entire system may be liquid-filled without trapped gases. As will be evident hereinafter the the vaporizer 28 has two outlets, one for connecting the vaporizer gas output to a first valve $V_6$ of the assembly 26, the valve in turn being connected to the vacuum pump 30. The output of pump 30 is preferably connected to a closed system (not shown) for capturing the output of the vacuum pump when the latter is used. The other outlet of vaporizer 28 is connected to a second valve $V_5$ of the assembly 26, the latter valve being connected to a system 32, such as a processing chamber (not shown).

As will be more evident hereinafter, the vaporization system includes a controller 36 for controlling the sequencing and operation of the pumps $P_{x1}$ and $P_{x2}$ and valves $V_1$–$V_6$ of the pump assembly 22 and vaporizer assembly 26. The controller preferably includes a microprocessor preferably programmed so as to operate the pumps and valves in accordace with a predetermined and novel sequence, all of which will be more evident hereinafter. In addition the preferred valves $V_1$–$V_6$ are pneumatically actuated and therefore are connected to a source 34 of pressurized air, each through a corresponding electromechanical valve 38a 38f. The opening and closing of the latter also is controlled by the controller 34. As will be more apparent hereinafter, the pumps $P_{x1}$ and $P_{x2}$ and the valves $V_1$–$V_4$ are constructed in a novel manner.

Figure 2:
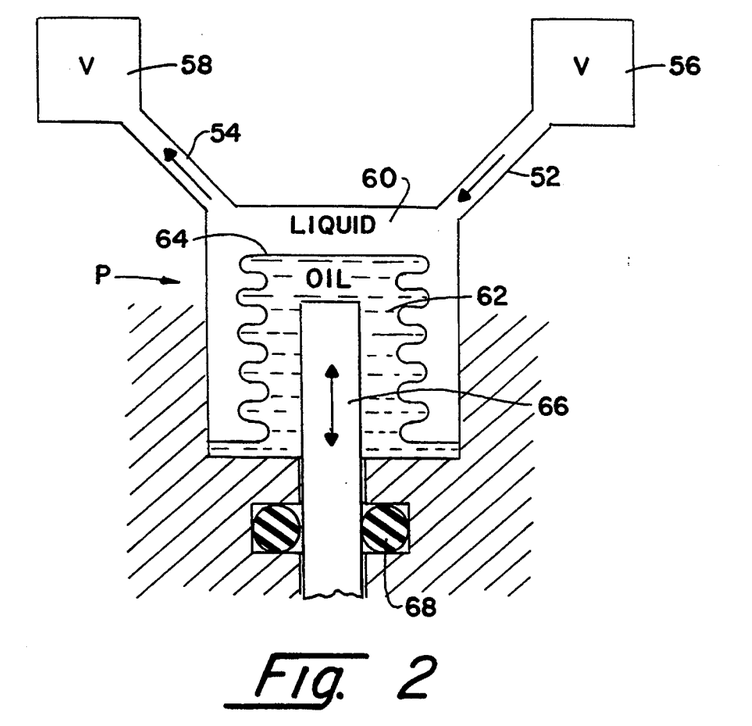
FIG. 2 is a schematic illustration taken in longitudinal cross section through the preferred embodiment of the pump as designed and used in accordance with the present invention.

The pumps $P_{x1}$ and $P_{x2}$ are substantially identical, except as noted below, with a simplified schematic longitudinal cross sectional view of one of the pumps being shown in FIG. 2. As shown in FIG. 2, the inlet 52 and outlet 54 of each pump P are connected to the associated valves, indicated at 56 and 58, respectively. The pump includes a pump chamber 60 having a volume which changes as the pump fills and delivers. The chamber in turn connects the inlet to the outlet so that when the valves 56 and 58 are opened, liquid will pass through inlet 52 into the chamber 60, and subsequently through outlet 54. The pump P also includes a compartment 62 separated from the chamber 60 by an expandable bellows seal 64. It should be evident that other expandable elements, such as a diaphragm or a bellowfram can be used in place of the seal 64. The compartment 62 is filled with a substantially incompressible liquid, e.g., oil. Actuating means, shown in the form of a ram shaft 66, is movable through the seal 68 into and out of the compartment 62. The shaft preferably has a uniform cross sectional area along its length so that as the shaft 66 moves into or out of a tubular fitting 67 disposed within the compartment at a uniform rate, the displaced oil will respectively cause the bellows seal to expand or contract at a uniform rate resulting in the volume within the chamber increasing or decreasing at a uniform rate.

More specifically, during the filing phase of each pump, the shaft 66 retracts from the compartment 62 (and therefore causes the bellows seal 64 to contract) at a uniform rate. During this phase the valve 56 is opened in order to allow liquid to pass through the inlet 52 into the compartment 62. The volume of the chamber 60 enlarges at a uniform rate as the ram shaft retracts. During the delivery phase of the pump, the shaft 66 is movable in the opposite direction (in an upward direction in FIG. 2) so that the shaft moves into the compartment (and therefore causes the bellows seal to expand).

As will be more evident hereinafter, during the delivery phase, the valve 58 may be initially closed so that any back lash in the system can be accounted for and the pressure of the liquid in chamber 60 increased to a predetermined level, before valve 58 is automatically opened in response to the increasing pressure at the inlet. The cross-section of each of the inlets and outlets 52 and 54 are of a relatively small dimension (e.g., 1/32nd or 1/16th of an inch) for reasons which will be described in greater detail hereinafter.

Figure 3:
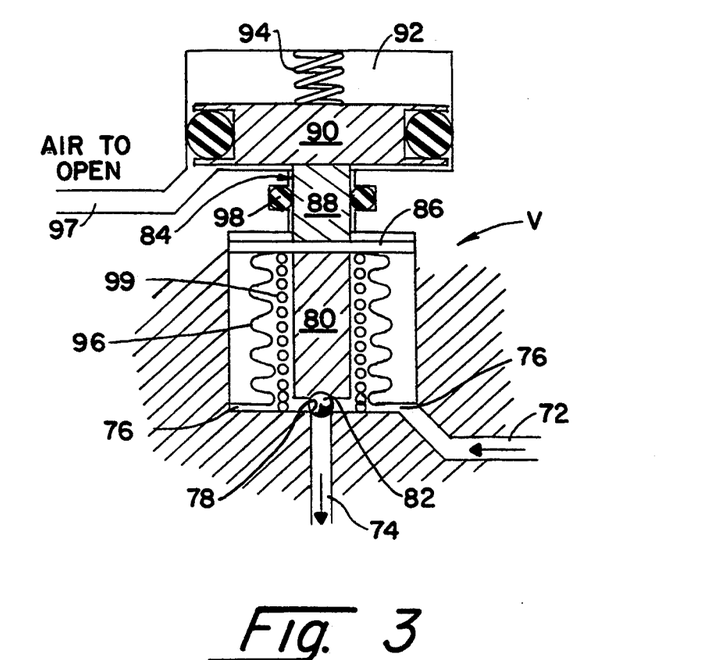
FIG. 3 is a schematic illustration taken in longitudinal cross section through the preferred embodiment of each of the valves $V_1$–$V_4$ of FIG. 1 as designed and used in accordance with the present invention.
Figure 5:
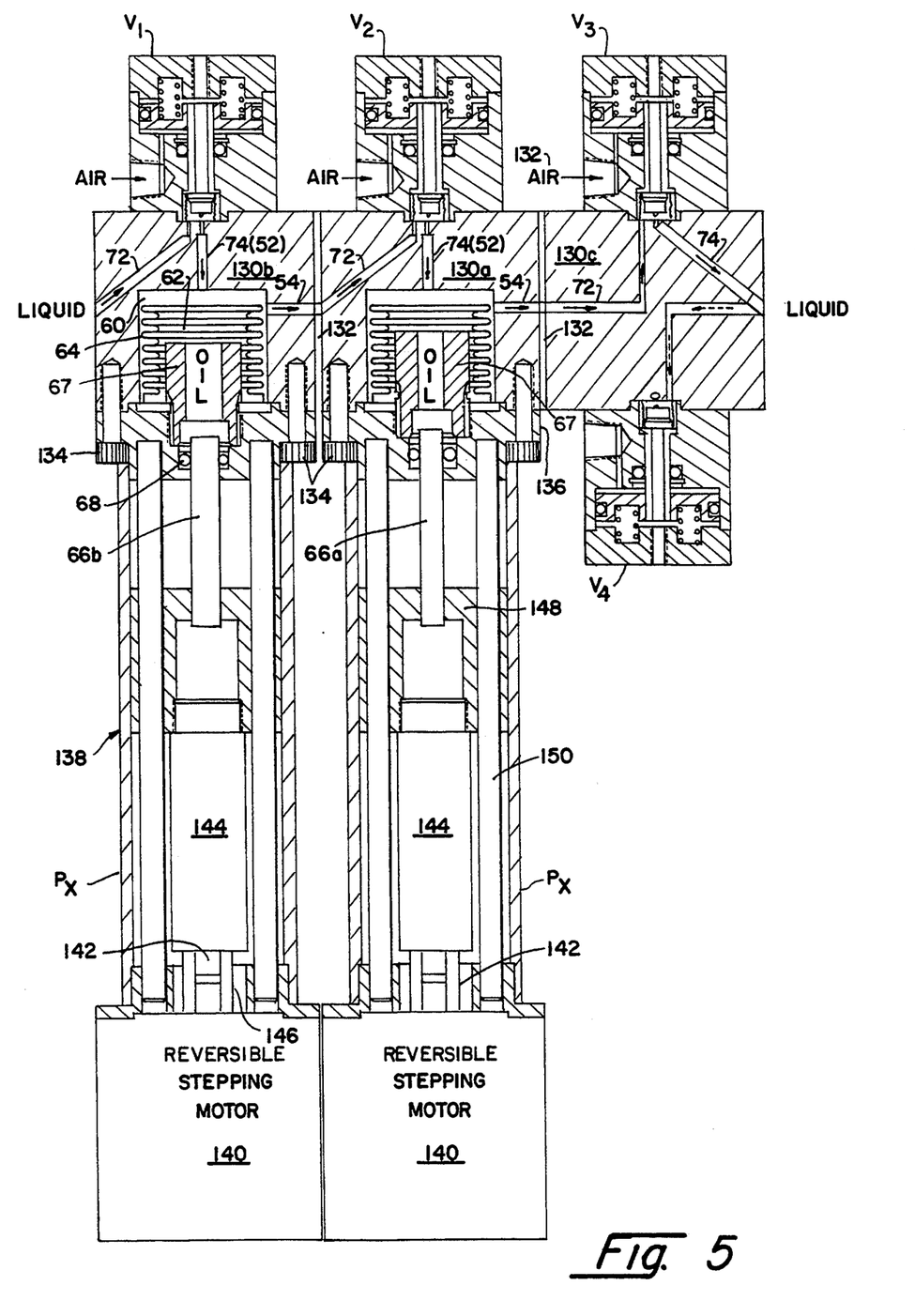
FIG. 5 is a longitudinal cross sectional view of the preferred embodiment of the pump assembly shown generally in FIG. 1.
Figure 6:
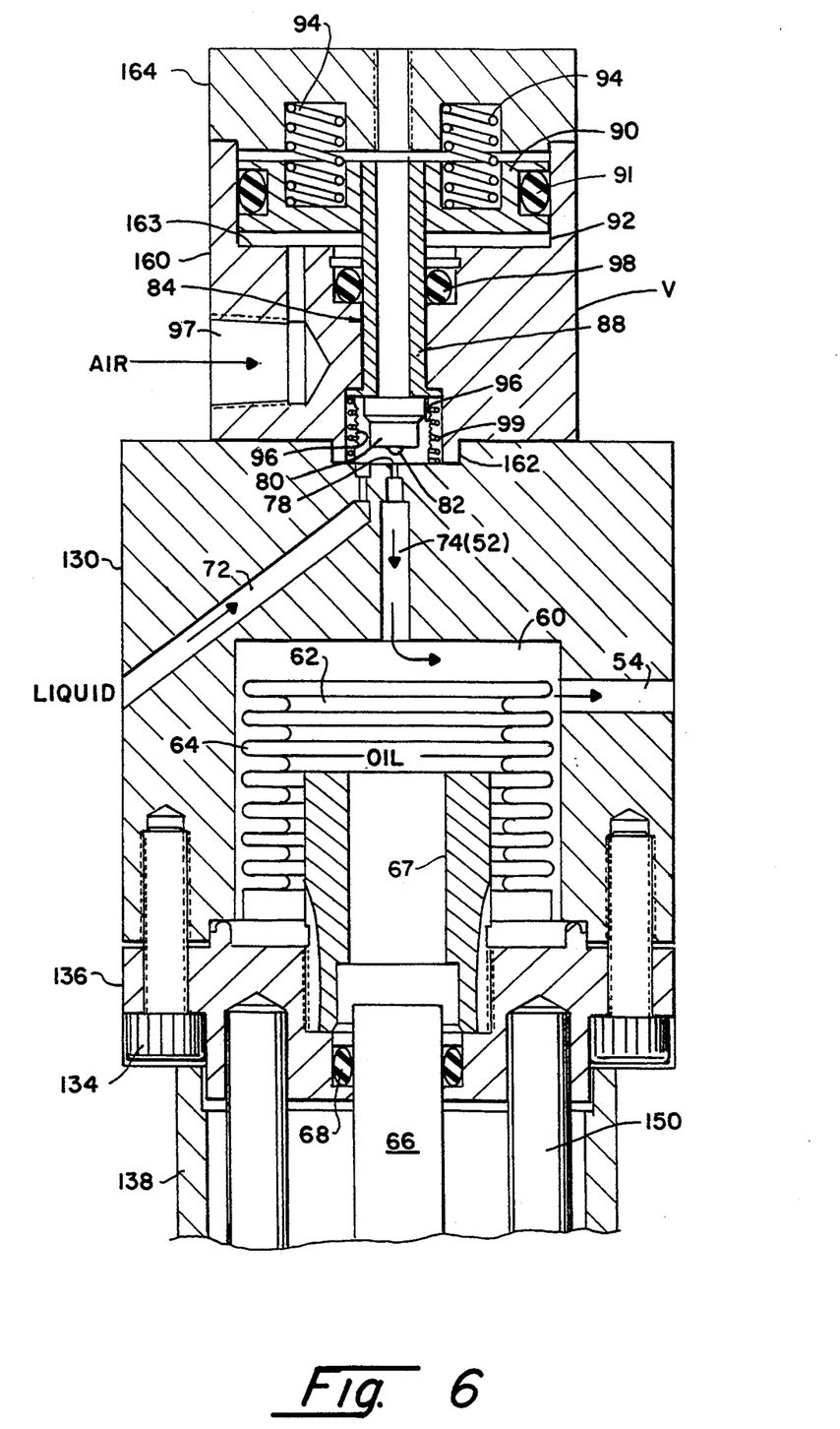
FIG. 6 is an enlarged more detailed longitudinal cross-sectional view, partially cut away, of the pump and valve shown in FIG. 5.

The valves $V_1$-$V_4$ are also indentical to one another, with a simplified cross sectional view of one of the valves V being shown in FIG. 3. Each valve V includes an inlet 72 to and outlet 74 from the valve passageway 76. Both the inlet and outlet are of a relatively small cross-sectional dimension, and in the preferred embodiment are merely extensions of the inlets and outlets 52 and 54 of the associated pump as best seen in FIGS. 5 and 6 described hereinafter. A valve seat 78 is provided within the passageway 76 at the outlet 74. A valve body 80 is movable within the passageway relative to the valve seat between an opened position wherein the end of the valve body (shown as a spherical ball 82) is spaced from the valve seat 78, and a closed position when the body 80, and in particular the ball 82, is in contact and seals with the seat. Means for moving the valve body 80 (and spherical ball 82) between the opened and closed position includes a piston 84 including a piston head 86 in contact with the valve body 80, a shaft 88, mounted for axial movement toward and away from the valve seat 78, for moving the valve body toward the valve seat and a pneumatic actuator head 90 for axially moving the shaft. The actuator head is disposed within an air chamber 92 so that it can move in the same axial direction as the valve body 80 and shaft 88. O-ring 91 provides a seal between head 90 and the wall of chamber 92. Means, in the form of one or more compression springs 94, bias the actuator head 90, shaft 88, piston head 86 and valve body 80 into the closed position. A flexible bellows seal 96 separates the liquid in valve passageway 76 from the actuating portion of the valve assembly. The force provided by the compression spring 94 is sufficient to maintain the valve closed until the pressure of the liquid in the bellow seal 96 exceeds a predetermined pressure due to the forces exerted by the liquid side of the bellows seal in contact with the bottom of the piston head 86. In the preferred embodiment of the valve assembly, the valve assembly is designed to automatically open when the predetermined pressure of the liquid in the passageway 76 of the valve assembly reasches 250 psi, although this design threshold pressure can vary. Further, because of the relatively small cross-sectional dimension of the outlet 74, when the valve assembly is closed and the back pressure of the liquid in outlet 74 reasches the threshold level the force exerted on the ball 82 is insufficient to open the valve due to the much smaller area upon which force is applied (compared to the area of the bellows seal in contact with the bottom of the piston head 86). An air line 97 is connected to the air chamber 92. When pressurized air is introduced through air line 97 into the chamber 92, sufficient force is applied to the actuator head 90 so as to move the head 90 axially against the bias of the compression spring 94 moving the shaft 88 and valve body 80 away from the valve seat 78 to the opened position. The O-ring seal 98 maintains the air chamber 92 air tight. Finally, if necessary a compression spring 99 can be provided to insure that the body 80 unseats from the valve seat 78 when the valve is opened.

Figure 4:
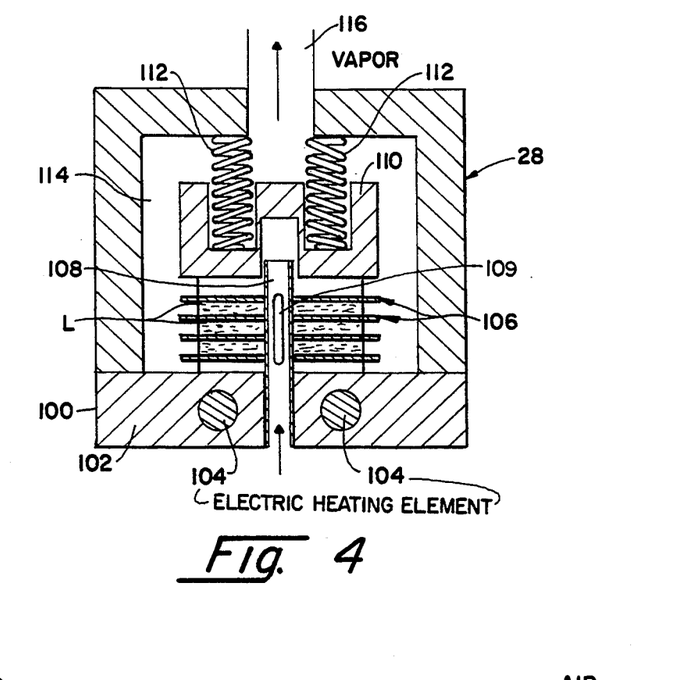
FIG. 4 is a schematic illustration taken in longitudinal cross section through the preferred embodiment of the vaporizer as designed and used in accordance with the present invention.

The simplified longitudinal cross sectional view of the vaporizer 28 is shown in FIG. 4. Vaporizer 28 includes a heater assembly 100 including a block 102 and heater elements 104 inserted in the block 102 so as to form a heat source for the stack of disks 106. The disks are preferably flat and annular in shape and very thin and secured in the absence of liquid flow in contact with one another so that good heat conduction is provided from the block 102 through the disks 106 and the surface area of each of the disks can be heated above the flash point of the liquid being pumped into the vaporizer. The disks, for example, can have a diameter to thickness ratio of 1 inch: 0.001 inch, although the dimensions and ratio can vary. A center aperture is formed in the heater block and aligned with the center apertures of the disks so that a small tube 108 can be positioned through the block and disks. The tube 108 is provided with a plurality of apertures around its circumference adjacent the internal rim of the disks so that liquid (indicated as L in FIG. 4) forced through the tube will be forced between the disks 106. To bias the disks together, while insuring the passage of liquid between the disks, an anvil 110 is biased, with for example one or more compression springs 112, into contact with the stack so as to force the disks of the stack into contact with one another and the heater block. The disks 106, anvil 110, springs 112 and the portion of the tube 108 extending through the heater block into the disks are all contained within a vaporization chamber 114 having the vapor outlet 116. As liquid is forced through the tube 108, it will force the disks apart against the bias of springs 112 so that liquid will be forced between adjacent disks. The large confronting surface areas of the disks provide large hot surface areas which heat the relatively thin layers of liquid therebetween above the flash point so that the liquid is flash vaporized and passed as vapor out of the outlet 116.

A more detailed illustation of the pump assembly is shown in FIGS. 5 and 6. Three blocks 130a, 130b and 130c respectively are provided for defining the inlets 72 and outlets 74 of the valves $V_1$, $V_2$ and $V_3$. Valve $V_4$ is secured to the bottom of the block 130c. Valves $V_1$, $V_2$ and $V_3$ are respectively secured to the top of each block. The outlet 74 of valve $V_1$ forms the inlet 52 of the pump $P_{x1}$, while the outlet 74 of valve $V_2$ forms the inlet 52 of the pump $P_{x2}$. The blocks 130 are secured with gaskets 132 so that the outlet 54 of block 130b is connected to the inlet 72 of block 130a, and similarly outlet 54 of block 130a is connected to the inlet 72 of block 130c. The bottom of each of the blocks 130a and 130b is counterbored so as to form the space for chamber 60 and compartment 62.

The pumps $P_{x1}$ and $P_{x2}$ are respectively connected with any suitable means such as plates 136 and screws 134 to the bottom of the respective blocks 130a and 130b. The open end of bellows seal 64 is secured between the bottom of the respective block and plate so as to separate the oil chamber 62 from the liquid passageway 60. Each plate includes a center aperture which is counter bored so as to provide an annular shoulder for supporting the O-ring seal 68. Each plate 136 supports a housing 138, which in turn supports the pumping actuator mechanism.

Specifically, a stepping motor 140 drives a shaft 142 of ball nut assembly 144 through the coupler 146. A rotation to linear motion translating element 148 for supporting the ram shaft 66a or 66b is secured to the nut assembly 144 and slidable on the anti-rotation shafts 150 so that rotation of the stepping motor causes the shaft 142 of the ball nut assembly 144 to rotate. This, in turn, causes the element 148 to slide on the shafts 150 so that the ram shaft 66 can be moved within the O-ring seal 68 in and out of the oil in the compartment 62 depending on the direction of rotation of the motor 140.

Thus, by causing the stepping motor 140 to rotate in one direction at a constant angular speed, the shaft 66 will move into the compartment at a constant linear speed. Similarly, by reversing the direction of the motor and rotating the shaft 142 of the nut assembly at a constant angular speed in the opposite direction, the shaft 66 will retract from the chamber at a constant linear speed. For reasons which will be more evident hereinafter, the ram shaft 66b of the pump $P_{x1}$ has a cross sectional area twice that of the ram shaft 66a of the pump $P_{x2}$ so that for a given angular speed at which the motors 140 are driven, the ram shafts are driven into the corresponding compartment 62 at the same linear speed resulting in the ram shaft 66b displacing twice the amount of liquid in the chamber 60 of the block 130b than the ram shaft 66a displaces in the chamber 60 of the block 130a. As shown the only portions of the pump assembly exposed to the toxic and dangerous liquid is the block 130, bellows seal 64 and gasket 132. As such these elements are made of a material non-reactive with the liquid passing through the pump. For example, for most applications, these parts can be made of a stainless steel, although other materials are also available.

The valves $V_1$–$V_4$ are all identical, with the details of the preferred valve being shown best in FIG. 6. Each valve is secured to a block 130 and includes a main block element 160 having a center bore for receiving the piston shaft 88. The main block element 160 is provided on its bottom surface with a cylindrical extension 162 within which a counter bore receives the bellows seal 96 and spring 99 and is in fluid communication with the inlet 72 and outlet 74 so as to define the passageway 76. The extension 162 is adapted to mate with a dimple formed in the top of the corresponding body 130 so as to insure that the valve is properly seated. The valve body 80 and ball 82 are disposed within the bellows 96 and are movable up and down (as shown in FIG. 6) between an opened and closed position, while the compression spring 99 is disposed within the bellows seal so as to insure the valve body unseats from the valve seat when the valve is opened. The top of the main block element 160 is also counter bored to receive the O-ring seal 98, and further counterbored at 163 on the top of the element so that the counterbore and cover plate 164, secured over the counterbore 163, form the air chamber 92. The 0-ring 98 is provided on an annular shoulder formed in the main block element, while wells are formed in the plate 164 for receiving a plurality of compression springs 94. An air inlet 97 is formed in the main block element 160 so that air is forced into the chamber 92 forcing the actuator head 90, in an upward direction as shown in Fig. 6. Again the parts of the valve exposed to the liquid, i.e., the valve body 80, ball 82, bellows seal 96 and main block element 160 are all made of a material non-reactive with the liquid passing through the valve.

Figure 7:
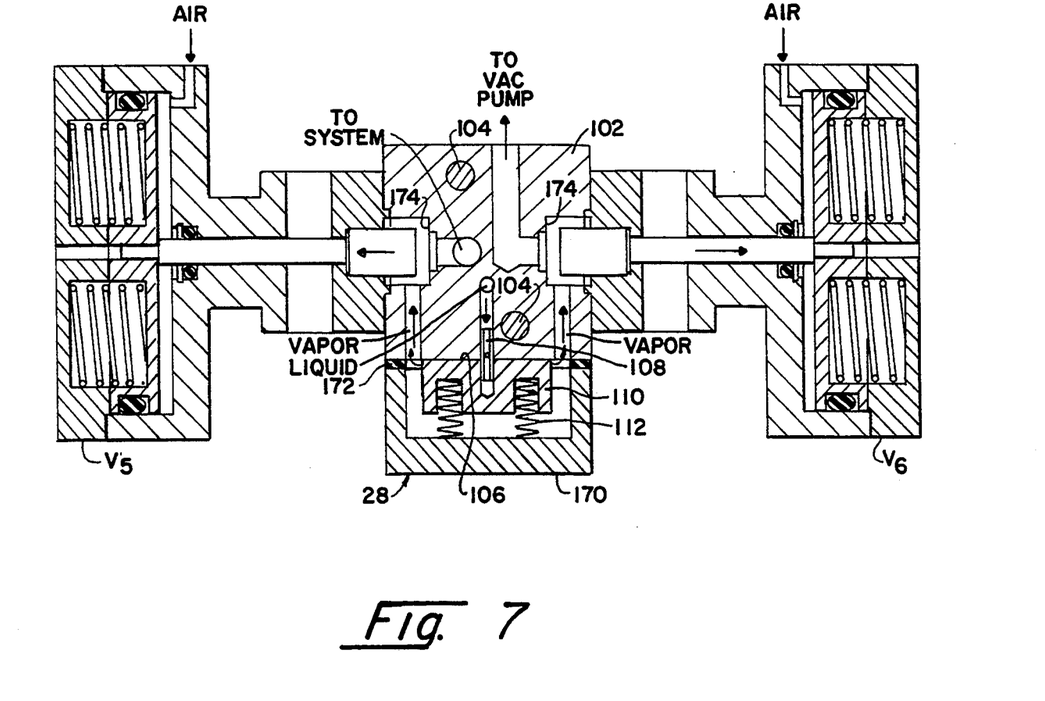
FIG. 7 is a longitudinal cross sectional view of the preferred embodiment of the vaporizer shown generally in FIG. 1.

Finally, the vaporizer assembly 26 is shown in greater detail in FIG. 7. As shown, cap 170 is secured over the heating block 102 with a sealing gasket 172 so as to cover the disks 106 and anvil 110. The heating block 102 is provided with two valve seats 174 for receiving the valve body of the corresponding valves $V_5$ and $V_6$. The valves $V_5$ and $V_6$ are pneumatic valves and move the respective valve bodies 176 into and out of contact with the respective seats 174.

Figure 8:
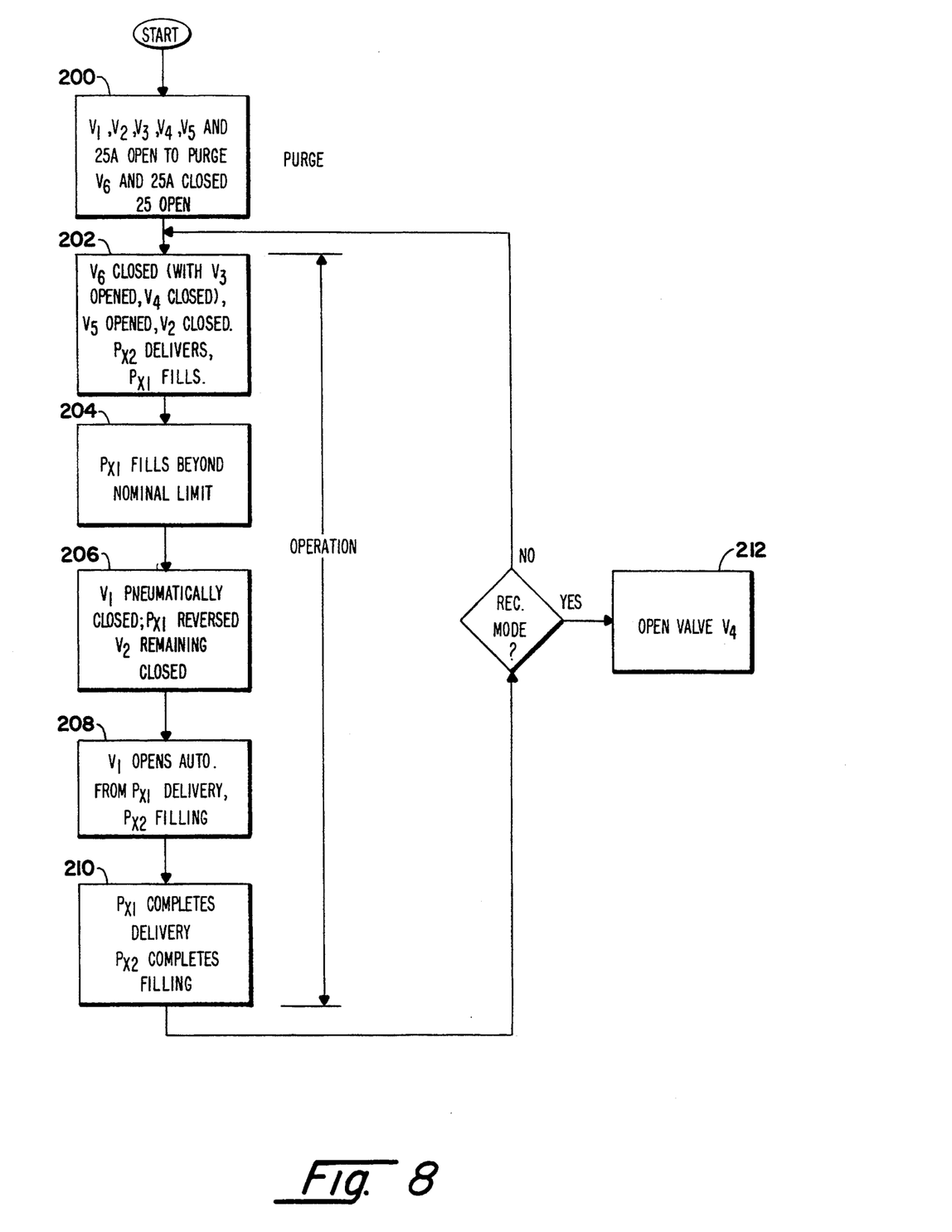
FIG. 8 is a flow chart illustrating the operation of the controller for sequencing the components of the vaporization system of the present invention.

The operation of the entire vaporization system 20 will now be described. As shown in FIG. 8 the controller operates the pumping system 22 in accordance with a predetermined sequencing so as to provide a constant volumetric rate of flow of liquid at the output of the pump assembly to the vaporizer 28. More specifically, in FIG.. 8 during start up, as indicated at step 200 valves $V_1$, $V_2$, $V_3$, $V_4$, $V_6$ and 25a are initially opened so that air will be removed from the pumps, vaporizer and interconnecting lines by vacuum pump 30. When the pressure has been reduced to substantially zero (e.g., <50 milliTort) valves $V_6$ and 25a are closed and valve 25 is opened allowing liquid to flow from the reservoir filling all evacuated spaces right up to the vaporizer disks 106 of vaporizer 28. Pumping and vaporizing can now begin.

The controller proceeds to step 202 at the beginning of its operational cycle and will shut off the valve $V_6$ by closing the valve 38f, the stepping motor 140 and the ram shaft 66 of the pump $P_{x2}$ will be at the beginning of the delivery phase of that pump, so that the ram shaft is fully retracted from the oil chamber. The stepping motor 140 and ram shaft 66 of pump $P_{x1}$ will be at the beginning of the filling phase of that pump, so that the ram shaft will be fully extended into the oil chamber. At step 202 valve $V_3$ remains opened, $V_4$ remains closed, while valve $V_5$ is now opened (by opening valve 38e) and valve $V_6$ is closed so that vapor from the vaporizer assembly 26 will be diverted to the system 32. In addition, at step 202, valve $V_2$ is closed. During each cycle the pumps operate in opposition to one another so that the pump $P_{x2}$ now begins to deliver liquid at a constant volumetric rate through the valve $V_3$ which opens automatically when the liquid pressure generated by pump $P_{x2}$ reaches the level to overcome the spring force on top of the air piston (in the preferred example, 250 psi). Simultaneously, the stepping motor of pump $P_{x1}$ begins its filling phase by operating at twice the speed of the stepping motor 140 of pump $P_{x2}$ during the latter's delivery phase so that the position of the ram shaft of pump $P_{x1}$ is at its nominal starting position half-way through the delivery phase of pump $P_{x2}$. The rain shaft is allowed to retract slightly further (e.g., typically an extra fifteen steps of the stepping motor out of a total 800 steps taken during the complete delivery phase) and stops at step 204. The delivery phase of pump $P_{x2}$ continues until just before the delivery phase of that pump ends (in the example given, with 15 steps of the motor 140 of the pump $P_{x2}$ being left before completion of the delivery phase).

At step 206 valve $V_1$ is pneumatically closed by closing valve 38a, the motor 140 of pump $P_{x1}$ reverses and that pump begins its delivery phase with the valve $V_2$ remaining closed until the ram shaft 66 reaches the nominal starting position (in the example given, for the first fifteen steps of the motor). This enables the pump $P_{x1}$ to accommodate any mechanical backlash in the ball nut assembly of the pump $P_{x1}$ and to compress the oil and liquid, to the extent they are compressible, in the chamber and passageway of the pump. At this point the pressure in the inlet of valve $V_2$ will be at the threshold level 250 psi.

Thus, at step 208, upon completion of the delivery phase of pump $P_{x2}$, pump $P_{x1}$ is now ready to deliver liquid at a constant volumetric rate and predetermined pressure. At step 208 valve $V_2$ opens automatically due to the pressure upstream caused by pump $P_{x1}$. Pump $P_{x1}$ will continue its delivery phase with valve $V_2$ opening automatically, and pump $P_{x2}$ will begin its filling phase. Because pump $P_{x1}$ delivers twice the volumetric rate as pump $P_{x2}$, pump $P_{x1}$ will deliver enough liquid to simultaneous fill pump $P_{x2}$ and deliver liquid out of valve $V_3$ at the same volumetric rate as was delivered by pump $P_{x2}$.

Once pump $P_{x1}$ has completed its delivery phase at step 210 of operation, the process repeats with valve $V_1$ opening, closing valve $V_2$ due to the sudden drop in pressure because $V_1$ was pneumatically opened. The pump $P_{x2}$ begins its delivery phase and pump $PX1$ begins its filling phase at twice the speed of pump $P_{x2}$, all by repeating step 202 and then subsequently repeating steps 204–210.

It should be appreciated that as the liquid is pumped through the vaporizer 28 by the pumps $P_{x1}$ and $P_{x2}$, the liquid is flash vaporized and forced by pressure through valve $V_5$ to the system 32.

As shown in FIG. 8 if it is desired to temporarily stop the process at the end of step 210, the pump assembly can be operated in a recirculation mode, simply by opening valve $V_4$ by opening valve 38d to allow the output flow of liquid from valve $V_3$ to flow back to the input of valve $V_1$.

During the operational mode and recirculation mode, the stepping motors 140 of the pumps operate continuously, first in one direction for the filling phase, and then in the other direction for the delivery phase, with the reversing of direction from one phase to the other occuring almost instantaneously.

The system 20 thus described provides an improved relatively simple and inexpensive vaporization system adapted to be mounted directly on the vapor processing chamber requiring few short vapor flow lines. The improved vaporizer 28 vaporizes liquid in an energy efficient manner with minimal atomization, and without the need for additional inert gases. The pumping assembly 22 provides and improved positive displacement pumping system for delivering liquid to a vaporizer at a constant volumetric rate. The pumps $P_{x1}$ and $P_{x2}$ each provide an improved pump for providing a constant volumetric rate and pressure delivery when operating in a delivery phase with minimal parts exposed to the liquid passing through the pump. Each valve $V_1$–$V_4$ provides an improved valve for allowing flow to occur only when a threshold pressure at the inlet of the valve has been achieved and remaining closed when the threshold pressure is applied as back pressure to the valve when the valve is closed.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A valve system adapted to open in response to fluid at its inlet at a predetermined pressure and to stay closed in response to back pressure less than said predetermined pressure exerted by the fluid at its outlet, said system comprising:

means for defining a closed passageway;

means for defining an inlet to said passageway for receiving fluid up to said predetermined pressure;

means for defining a fluid outlet from said passageway through which fluid passes out of said valve system;

means for defining a valve seat within said passageway;

a valve body movable relative to said valve seat between an opened position wherein the body is spaced from the seat when the valve system is opened and a closed position wherein the body is in contact with the seat when the valve system is closed;

biasing means for biasing said valve body into said closed position, wherein the force created by said biasing means on said valve body is such that the force created by said fluid at said predetermined pressure at said inlet causes said valve body to move to the open position when said valve body is in the closed position, while said valve body remains in the closed position when said fluid at said predetermined pressure is provided at said outlet when the valve body is in the closed position;

means for providing a force on said valve body greater than and in the opposite direction from the force provided by the biasing means so that said valve body can be quickly moved from the closed position to the opened position so that fluid is immediately provided at the outlet, wherein said means for providing the force on said valve body includes a piston coupled to the valve body; and means for sealing said passageway from said piston;

wherein said biasing means includes at least one compression spring for biasing said piston against said valve body so as to bias said valve body in said closed position, and means for receiving an pressurized air for moving said piston against said bias so as to move said valve body to said opened position.

2. A valve system according to claim 1, wherein said means for sealing includes a bellows seal.

* * * * *